(12) United States Patent
Sugitani et al.

(10) Patent No.: US 8,371,972 B2
(45) Date of Patent: Feb. 12, 2013

(54) POWER UNIT AND STRADDLE-TYPE VEHICLE

(75) Inventors: Tsuyoshi Sugitani, Shizuoka (JP);
Mitsukazu Takebe, Shizuoka (JP);
Atsushi Aoyama, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 504 days.

(21) Appl. No.: 12/028,228

(22) Filed: Feb. 8, 2008

(65) Prior Publication Data
US 2008/0190673 A1    Aug. 14, 2008

(30) Foreign Application Priority Data

Feb. 9, 2007    (JP) ................................ 2007-031142

(51) Int. Cl.
*F16H 55/56*    (2006.01)
(52) U.S. Cl. ................ 474/44; 474/43; 474/8
(58) Field of Classification Search ............... 474/8, 17, 474/18, 19, 20, 21, 43, 44, 273
See application file for complete search history.

(56) References Cited

U.S. PATENT DOCUMENTS

2009/0277710 A1 * 11/2009 Sugitani et al. ............... 180/231

FOREIGN PATENT DOCUMENTS

| EP | 1443246 A2 | 1/2004 |
| EP | 1741964 A2 | 1/2007 |
| EP | 1956269 A1 * | 8/2008 |
| EP | 1967768 A2 * | 9/2008 |
| JP | 2003301904 A | 10/2003 |
| JP | 2006-118630 | 5/2006 |
| JP | 2008196562 A * | 8/2008 |
| JP | 2008215506 A * | 9/2008 |

OTHER PUBLICATIONS

European Search Report for corresponding European application 08250471.3.

* cited by examiner

*Primary Examiner* — Michael Mansen
*Assistant Examiner* — Juan Campos, Jr.
(74) *Attorney, Agent, or Firm* — Rabin & Berdo, P.C.

(57) ABSTRACT

An engine unit includes a crank shaft that receives a driving force of an engine and a moving pulley that is movable in an axial direction. Keyholes are formed on an outer peripheral surface of the crank shaft. Axially extending guide holes are formed on a boss portion of the moving pulley in positions that correspond to the keyholes. Ends of keys are mounted to the keyholes. The guide holes receive therein bases of the keys to guide relative movements of the moving pulley and the crank shaft in an axial direction.

9 Claims, 8 Drawing Sheets

POWER UNIT AND STRADDLE-TYPE VEHICLE

RELATED APPLICATIONS

This application claims the benefit of priority under 35 USC 119 of Japanese patent application no. 2007-031142, filed on Feb. 9, 2007, which application is hereby incorporated by reference in its entirety.

BACKGROUND OF THE INVENTION

1. Field of the Invention

The present invention relates to a rotating shaft that receives a driving force of a power source and a pulley around which a belt for transmission of the driving force is wound.

2. Description of Related Art

A straddle-type vehicle such as a motorcycle may include an engine and a continuously variable transmission (CVT) for stepless change in reduction ratio. CVTs generally include a-belt for transmission of driving force of an engine to a drive wheel, and a moving pulley around which the belt is wound that moves in an axial direction to vary a diameter of the portion on which the belt is stretched. In some conventional CVTs, keyways are formed on a boss of a moving pulley and a crank shaft onto which the boss is fitted. Keys are inserted into the keyways from radially so that the moving pulley and crank shaft rotate integrally (see, for example, JP-A-2006-118630).

In JP-A-2006-118630, however, the work of assembling the crank shaft and moving pulley is complex. When the crank shaft and moving pulley are to be assembled, either the crank shaft or the moving pulley is rotated so that positions of the keyways are in agreement. While holding this state, a key is inserted into the keyways. In order to prevent coming-off of the key, the key is generally press fit into either the keyway of the crank shaft or the keyway of the moving pulley. However, after the keyways are caused to positionally agree with each other, they sometimes get out of position before the key is press fitted. The crank shaft or moving pulley must then be rotated again to bring the keyways back into positional agreement, thus making the work complex.

SUMMARY OF THE INVENTION

The invention addresses this problem and provides a power unit wherein the workability of assembling a moving pulley is improved.

A power unit according to one embodiment of the invention comprises a power source and a rotating shaft that receives a driving force output from the power source. A moving pulley includes a cylindrical-shaped boss portion that extends in an axial direction of and is fitted onto the rotating shaft to be movable in the axial direction. Shaft side holes are formed on an outer peripheral surface of the rotating shaft. Boss side holes are formed on and extend through the boss portion in positions that correspond to the shaft side holes. Detent members are inserted through the shaft side and boss side holes. One end of each detent member is mounted to either a shaft side hole or a boss side hole. Another end of each detent member is received by the corresponding shaft side hole or boss side hole which comprises a slot extending in the axial direction to guide relative movements of the moving pulley and the rotating shaft in the axial direction.

A straddle-type vehicle according to the invention comprises the power unit. The straddle-type vehicle may be, for example, a motorcycle (including scooters), four-wheeled buggy, snowmobile, two-wheeled electric motor car, etc.

According to the invention, in assembling the moving pulley and a crank shaft, one pair of the shaft side and boss side holes is used to hold rotated positions of the moving pulley and the crank shaft. The shaft side and boss side holes are thereby prevented from getting out of position, thus improving the workability of assembly.

According to an embodiment of the invention, the shaft side holes are provided at equal intervals in a circumferential direction on an outer peripheral surface of the rotating shaft, and the boss side holes are provided at equal intervals in the circumferential direction on the boss portion. According to this embodiment, centrifugal forces generated by the rotating shaft are balanced with each other, so that stability in rotation of the rotating shaft is achieved. According to this embodiment, the boss portion may be formed with two boss side holes and the rotating shaft may be formed with two shaft side holes.

According to an embodiment of the invention, the boss side holes comprise the slots extending in the axial direction. According to this embodiment, relative movements of the rotating shaft and moving pulley are made smooth as compared with a case where the shaft side holes comprise slots. That is, where the other ends of the detent members are received in and move along the slots, friction is generated between the other ends and the slots. Since the boss side holes are disposed outwardly of the shaft side holes in a diametrical direction of the rotating shaft, friction generated where the other ends of the detent members move relatively along the boss side holes is small as compared with friction generated where the other ends move along the shaft side holes. As a result, relative movements of the rotating shaft and the moving pulley are smooth as compared with a case where the plurality of shaft side holes comprise slots.

According to an embodiment of the invention, the rotating shaft includes a shaft portion that receives a driving force of the power source, and a cylindrical-shaped collar portion formed with the shaft side holes and fitted onto the shaft portion to rotate together with the shaft portion. The shaft side holes extend through the collar portion and the detent members are press fitted into the shaft side holes. According to this embodiment, as compared with a case where the shaft side holes comprise bottomed recesses, forces with which the shaft side holes tend to push out the detent members are decreased, so that the detent members are prevented from coming off the shaft side holes. Also, in this case, the collar portion may include a cylindrical-shaped lubricant holding portion having a clearance between it and an outer peripheral surface of the shaft portion and accumulating a lubricant in the clearance, and the plurality of shaft side holes may extend through the lubricant holding portion. Thereby, a lubricant accumulated between the outer peripheral surface of the shaft portion and the lubricant holding portion is permeated outside the collar portion to enable lubrication between the boss portion and the collar portion and between the boss side holes and the detent members.

According to an embodiment of the invention, the rotating shaft includes a shaft portion that receives a driving force of the power source, and a cylindrical-shaped collar portion formed with the shaft side holes and fitted onto the shaft portion to rotate together with the shaft portion. The collar portion is fitted onto the shaft portion so as to enable removal from the shaft portion. According to this embodiment, the moving pulley can be exchanged by removing the collar portion from the shaft portion without removing the whole rotating shaft from the power unit.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
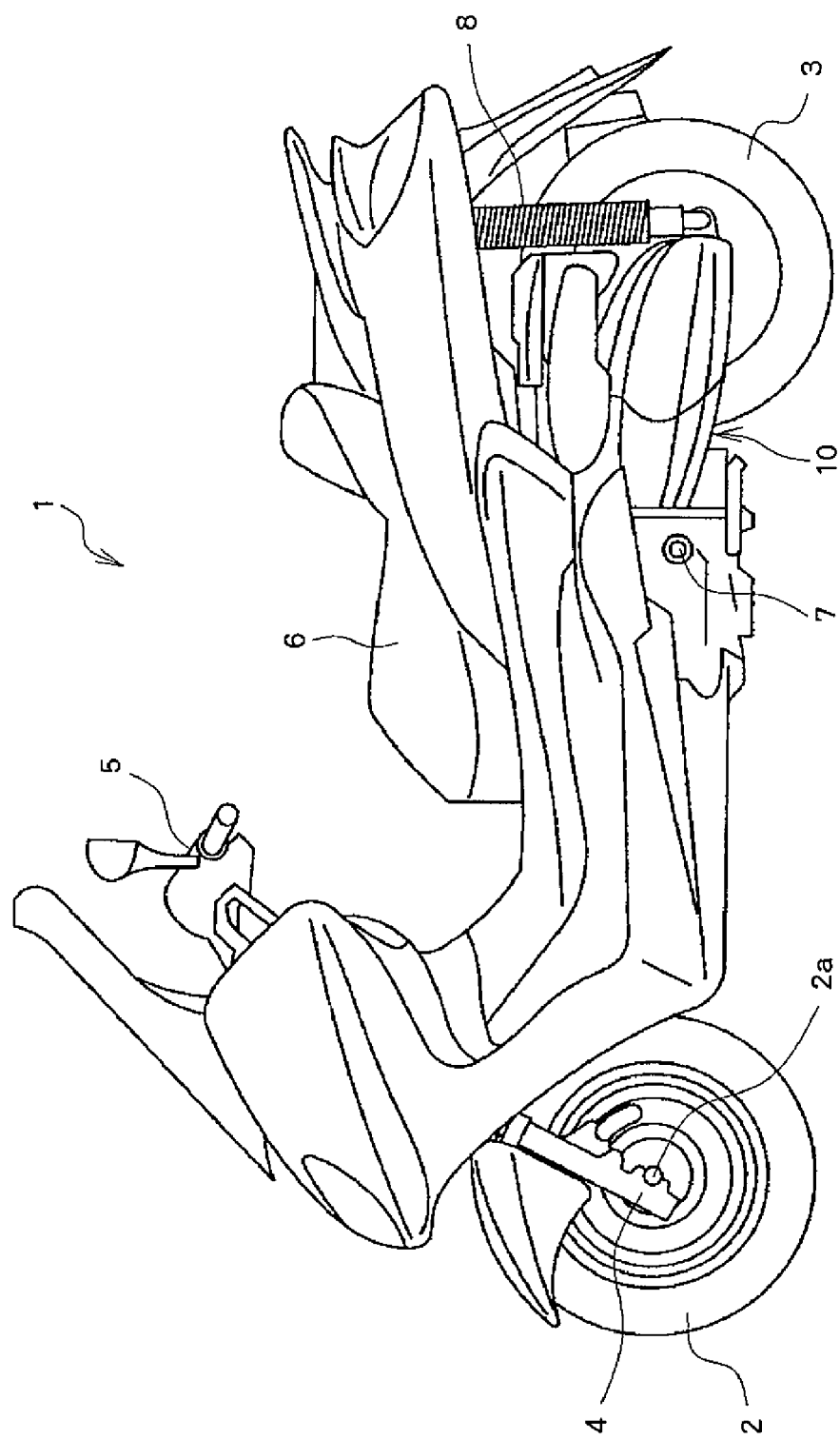
FIG. 1 is a side view of a motorcycle having an engine unit according to an embodiment of the invention.
Figure 2:
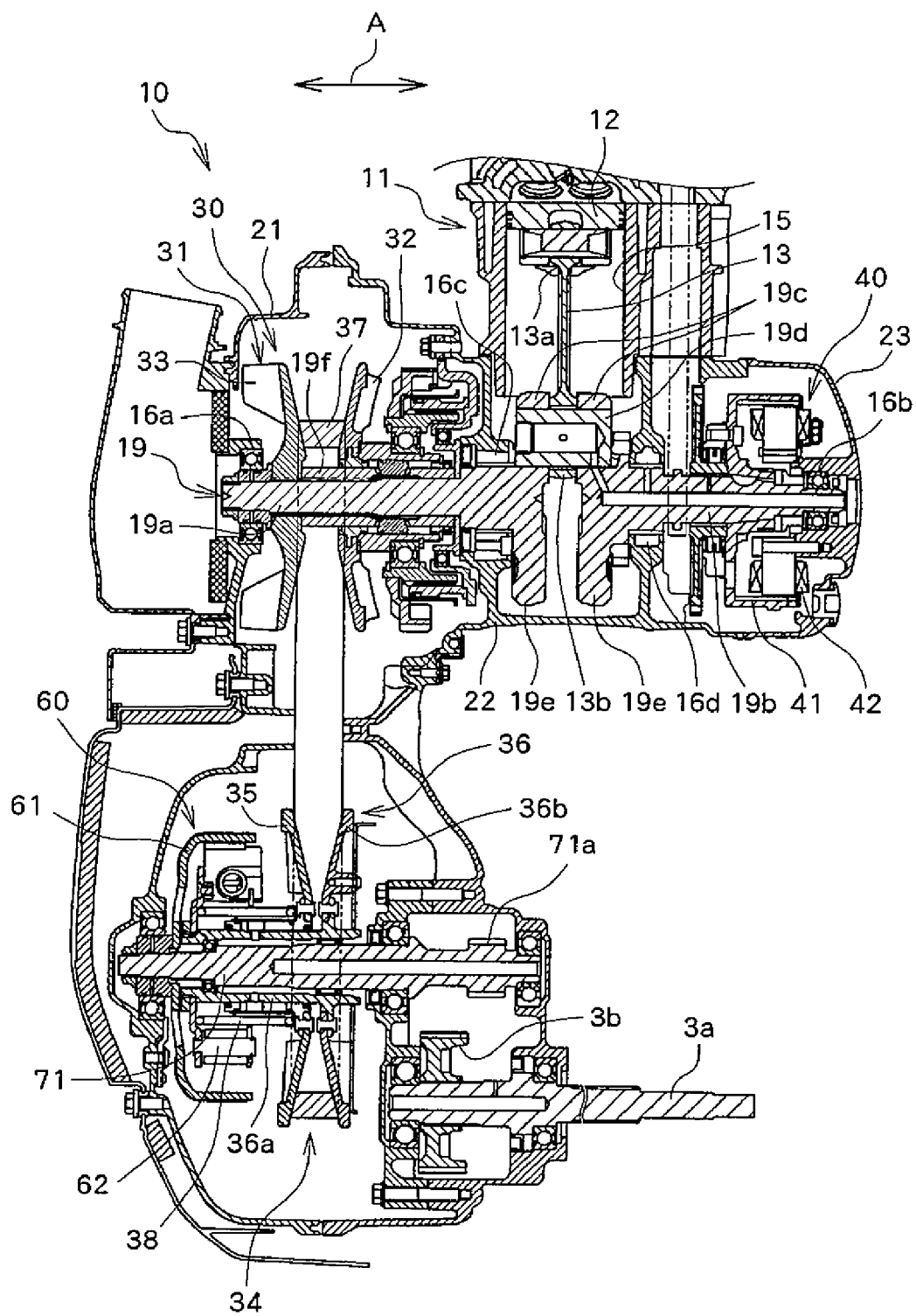
FIG. 2 is a cross sectional view of the engine unit.
Figure 3:
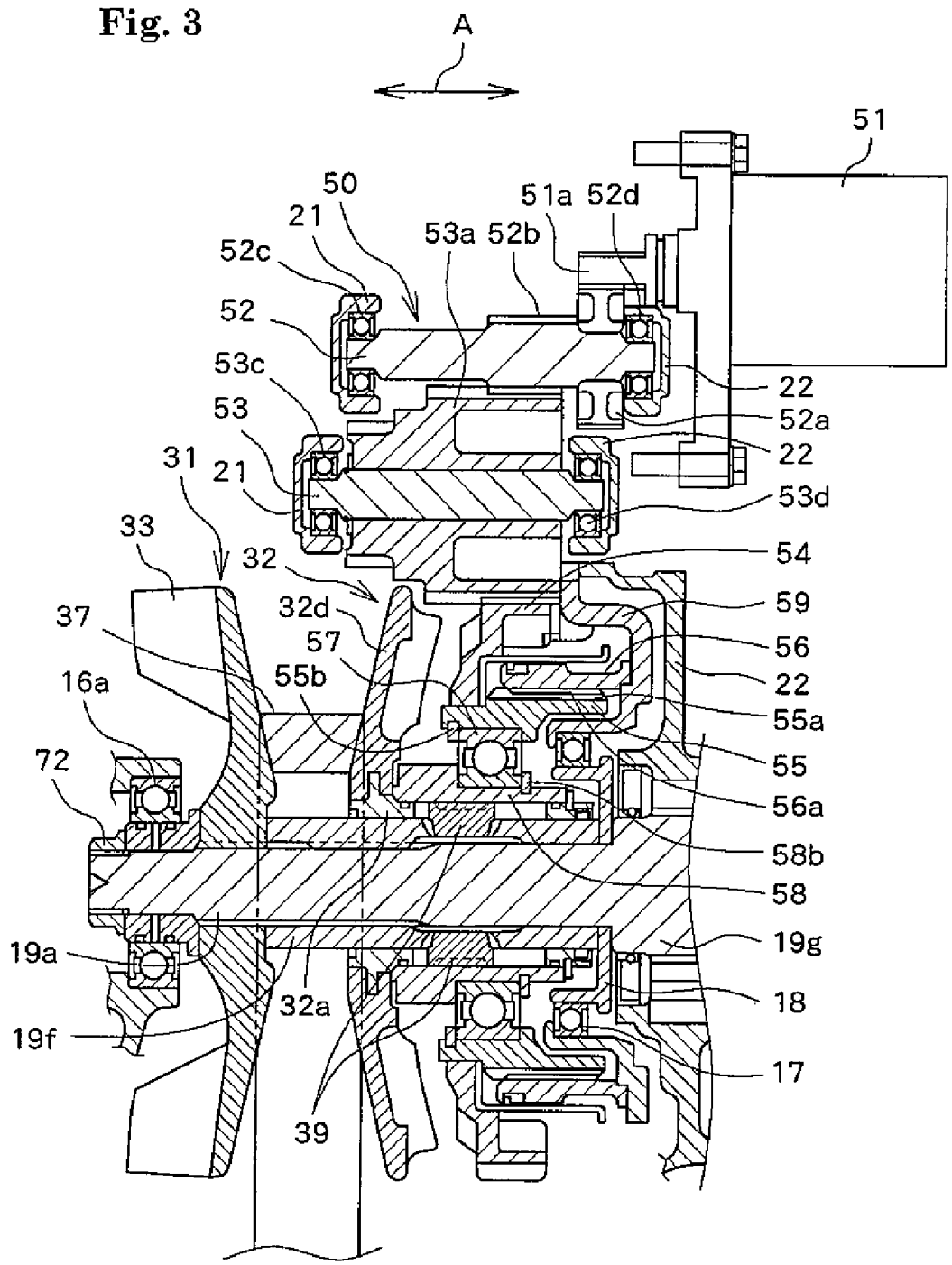
FIG. 3 is a partial, cross sectional view of a continuously variable transmission (CVT) provided on the engine unit, including a drive side pulley and a pulley moving mechanism provided on the CVT.

An embodiment of the invention is described below with reference to the drawings. FIG. 1 is a side view of a motorcycle 1 provided with an engine unit 10. FIG. 2 is a cross sectional view of engine unit 10. FIG. 3 is a partial, cross sectional view of a continuously variable transmission (CVT) 30 provided on engine unit 10. FIG. 3 shows a drive side pulley 31 and a pulley moving mechanism 50 provided on CVT 30.

Motorcycle 1 includes a front wheel 2 and a rear wheel 3. An axle shaft 2a of front wheel 2 is supported by a lower end of a front fork 4. A handle 5 is connected to an upper portion of front fork 4. A seat 6 is arranged centrally of motorcycle 1. Engine unit 10 is arranged below seat 6 and is able to swing vertically about a fulcrum or pivot shaft 7 supported by the body frame. Engine unit 10 extends longitudinally and its rear portion supports rear wheel 3. Motorcycle 1 is a unit swing type vehicle and rear wheel 3 is able to swing vertically together with engine unit 10. A lower end of a rear suspension 8 is connected to a rear end of engine unit 10. An upper end of rear suspension 8 is connected to a rear end of the body frame.

As shown in FIG. 2, engine unit 10 includes an engine 11, CVT 30, a crank shaft 19 and a clutch 60. Engine 11 includes a piston 12 and a connecting rod 13. A mixture flowing into a cylinder 15 from an intake port burns whereby piston 12 reciprocates in cylinder 15. A small end 13a of connecting rod 13 is connected to piston 12. A large end 13b of connecting rod 13 is connected to a crank pin 19d of crank shaft 19.

Crank shaft 19 also includes shaft portions 19a, 19b, a pair of arms 19c and a pair of counterweights 19e. Crank shaft 19 is rotated by a driving force of engine 11. Shaft portions 19a, 19b extend in a vehicle width direction (direction A in FIG. 2). An end of shaft portion 19a is born rotatably by a bearing 16a fixed to a case cover 21 and a base thereof is born rotatably by a bearing 16c fixed to a crank case 22. An end of shaft portion 19b is born rotatably by a bearing 16b fixed to a case cover 23 and a base thereof is born rotatably by a bearing 16d fixed to crank case 22. Arms 19c stand radially upright from the bases of shaft portions 19a, 19b to support crank pin 19d in a position away from axes of shaft portions 19a, 19b. Counterweights 19e are provided on an opposite side to arms 19c with the axes of shaft portions 19a, 19b therebetween. In addition, crank shaft 19 includes a cylindrical-shaped collar portion 19f (see FIG. 3). Collar portion 19f is fitted on and spline-coupled to an outer peripheral surface of shaft portion 19a to rotate integrally with shaft portion 19a.

A generator 40 is arranged outwardly of shaft portion 19b in the vehicle width direction. A rotor 41 of generator 40 is mounted to shaft portion 19b so as to rotate together with shaft portion 19b and a stator 42 is fixed to case cover 23. Case cover 23 covers generator 40 from outward in the vehicle width direction.

CVT 30 is arranged outwardly of shaft portion 19a in the vehicle width direction. CVT 30 includes drive side pulley 31, a driven side pulley 34, and a belt 37 wound round pulleys 31 and 34 to transmit torque of drive side pulley 31 to driven side pulley 34.

Drive side pulley 31 includes a moving pulley 32 and a non-moving pulley 33 opposed to each other in an axial direction. Pulleys 32 and 33 rotate together with shaft portion 19a. Specifically, non-moving pulley 33 is fitted onto and spline-coupled to the end portion of shaft portion 19a. As described above, collar portion 19f is also fitted onto shaft portion 19a. As shown in FIG. 3, moving pulley 32 includes an axially extending cylindrical-shaped boss portion 32a and a flange portion 32d extending radially from an outer end of boss portion 32a in the vehicle width direction. Shaft portion 19a and collar portion 19f are fitted into boss portion 32a. A plurality of keys (detent members) 39 are inserted into boss portion 32a and collar portion 19f from radially of shaft portion 19a whereby collar portion 19f and moving pulley 32 rotate together.

Moving pulley 32 is movable axially of crank shaft 19 while non-moving pulley 33 is inhibited from moving axially. Flange portion 32d of moving pulley 32 and non-moving pulley 33 are conical-shaped members, tops of which butt against each other and between which belt 37 is interposed. A diameter of that portion of drive side pulley 31, on which belt 37 is stretched, is determined according to a position of moving pulley 32 in the axial direction. In addition, as shown in FIG. 3, moving pulley 32 is axially moved by operation of a pulley moving mechanism 50.

As shown in FIG. 2, driven side pulley 34 includes a moving pulley 35 and a non-moving pulley 36 opposed to each other in an axial direction. Non-moving pulley 36 includes a cylindrical-shaped guide portion 36a and a flange portion 36b extending radially from an end of guide portion 36a. Guide portion 36a extends axially of and is fitted onto a drive shaft 71 arranged rearwardly of crank shaft 19. Guide portion 36a is provided so as to idle relative to drive shaft 71 and is inhibited from moving axially of drive shaft 71. Moving pulley 35 is fitted onto guide portion 36a to be movable axially of drive shaft 71 along guide portion 36a. Moving pulley 35 and flange portion 36b of non-moving pulley 36 are conical-shaped members, tops of which butt against each other and between which belt 37 is interposed. Moving pulley 35 is biased toward flange portion 36b by a restoring force of a spring 38.

As described above, as moving pulley 32 is axially moved, a diameter of the portion of drive side pulley 31 on which belt 37 is stretched is varied. Moving pulley 35 is correspondingly moved axially and a diameter of the portion of driven side pulley 34 on which belt 37 is stretched is also varied. Thereby, CVT 30 is varied steplessly in speed reduction ratio.

Clutch 60 is arranged on an axis of drive shaft 71 outwardly of driven side pulley 34 in the vehicle width direction. In one embodiment, clutch 60 is a centrifugal clutch and includes a cylindrical-shaped clutch outer 61 having a bottom and a clutch weight 62 arranged inside clutch outer 61. Clutch weight 62 is provided so as to idle relative to drive shaft 71. Also, clutch weight 62 rotates together with driven side pulley 34 and is radially movable according to a rotating speed thereof. Clutch outer 61 rotates together with drive shaft 71. When driven side pulley 34 is increased in rotating speed, clutch weight 62 moves radially to generate a frictional force between it and an inner peripheral surface of clutch outer 61. Thereby, clutch outer 61 interlocks with clutch weight 62, so that torque of driven side pulley 34 is transmitted to drive shaft 71 through clutch weight 62 and clutch outer 61.

Drive shaft 71 is arranged away from an axle shaft 3a of rear wheel 3. A gear 3b is fitted onto and rotates with axle shaft 3a. A gear 71a is formed on an outer peripheral surface of drive shaft 71. Gears 71a and 3b mesh with an intermediate shaft to transmit torque from drive shaft 71 to axle shaft 3a.

A detailed explanation is now given to a construction, which rotates drive side pulley 31 and crank shaft 19 integrally, and pulley moving mechanism 50. First, pulley moving mechanism 50 is described.

As described above, pulley moving mechanism 50 moves moving pulley 32 of drive side pulley 31 axially to vary a speed reduction ratio by CVT 30. Pulley moving mechanism 50 moves moving pulley 32 on the basis of, for example, a throttle operation by a passenger, engine speed, etc. Pulley moving mechanism 50 includes, as shown in FIG. 3, an electric motor 51, a first intermediate shaft 52, a second intermediate shaft 53, a driven gear 54, a sliding member 55, a guide member 56, a bearing 57 and a support member 58.

A first reduction gear 52a that meshes with an output shaft 51a of electric motor 51 and is fitted onto and rotates integrally with first intermediate shaft 52. A gear 52b having a smaller diameter than that of first reduction gear 52a is formed on an outer peripheral surface of first intermediate shaft 52. A second reduction gear 53a that meshes with gear 52b of first intermediate shaft 52 is fitted onto and rotates integrally with second intermediate shaft 53.

Driven gear 54 is arranged coaxially with shaft portion 19a to mesh with second reduction gear 53a. Sliding member 55 is fitted into an inside of an opening formed centrally of driven gear 54 by, for example, spline to rotate integrally with driven gear 54. Sliding member 55 is a cylindrical-shaped member arranged on the axis of shaft portion 19a and has a feed screw (for example, male thread) 55a formed on an outer peripheral surface thereof. Guide member 56 is also a cylindrical-shaped member arranged on the axis of shaft portion 19a. An inner edge of guide member 56 in the vehicle width direction is fixed to a support member 59 mounted to crank case 22. Thereby, guide member 56 is inhibited from moving axially. A feed screw (for example, female thread) 56a formed on an inner peripheral surface of guide member 56 meshes with feed screw 55a of sliding member 55. Thereby, when torque of electric motor 51 is transmitted from driven gear 54, sliding member 55 is moved axially while rotating together with driven gear 54.

Support member 59 is an annulus-shaped member having a bearing 17 arranged on an inner peripheral surface thereof. Support member 59 is supported through bearing 17 by a support member 18, which is arranged inside bearing 17 to interlock with shaft portion 19a, to be independent of rotation of shaft portion 19a. Second reduction gear 53a is formed from a resin that contains, for example, a lubricant, whereby gear 52b of first intermediate shaft 52 and driven gear 54 are maintained in lubricating ability even when they are not supplied with a lubricating oil or the like.

Support member 58 is a cylindrical-shaped member arranged coaxially with shaft portion 19a. An inside diameter of support member 58 corresponds to an outside diameter of boss portion 32a of moving pulley 32 and boss portion 32a is fitted into support member 58. Support member 58 is arranged inside bearing 57, which is arranged inside sliding member 55. Support member 58 supports sliding member 55 with bearing 57 therebetween so as to have the same rotating about shaft portion 19a.

Relative movements of sliding member 55 and support member 58 in the axial direction are inhibited and support member 58 moves axially together with sliding member 55. In one embodiment, an outer peripheral side of bearing 57 is interposed between sliding member 55 and a circlip 55b mounted to an end of sliding member 55. An inner peripheral side of bearing 57 is interposed between support member 58 and a circlip 58b mounted to an end of support member 58. Thereby, relative movements of sliding member 55 and support member 58 in the axial direction are inhibited.

Pulley moving mechanism 50 is arranged between case cover 21 and crank case 22. A bearing 52c supporting first intermediate shaft 52 and a bearing 53c supporting second intermediate shaft 53 are supported by case cover 21, and a bearing 52d supporting first intermediate shaft 52 and a bearing 53d supporting second intermediate shaft 53 are supported by crank case 22.

Figure 4:
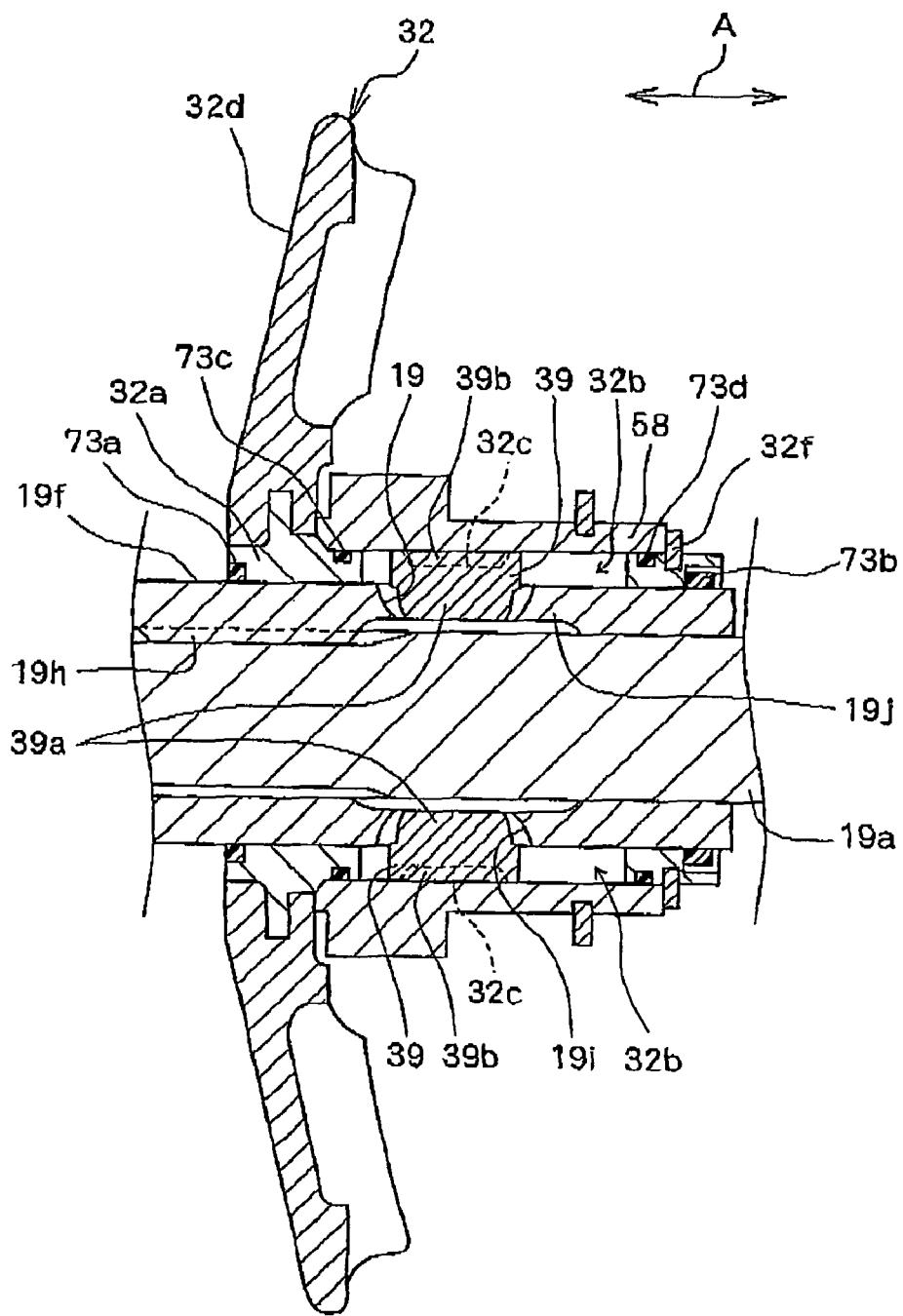
FIG. 4 is an enlarged cross sectional view of a moving pulley provided on the drive side pulley, including a shaft portion and a collar portion of a crank shaft and a support member.
Figure 5:
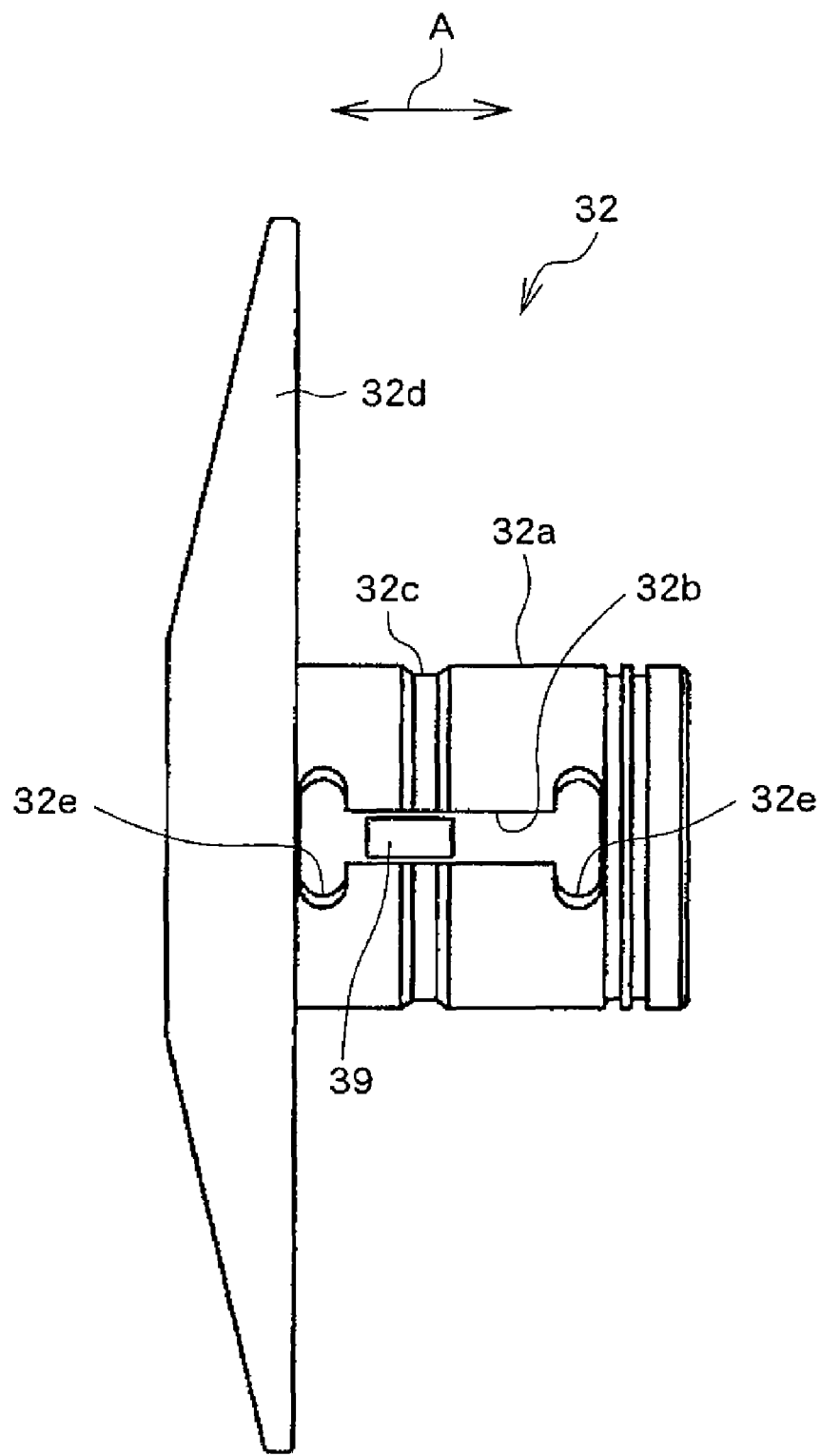
FIG. 5 is a plan view of the moving pulley.

A construction that rotates drive side pulley 31 and crank shaft 19 integrally is now explained. FIG. 4 is an enlarged cross sectional view of moving pulley 32 of drive side pulley 31 and FIG. 5 is a plan view of moving pulley 32. In FIG. 4, shaft portion 19a, collar portion 19f and support member 58 are shown together with moving pulley 32.

As shown in FIG. 3, an inner end of collar portion 19f in the vehicle width direction abuts against a base 19g of shaft portion 19a with support member 18 therebetween. Non-moving pulley 33 is fitted onto shaft portion 19a from outwardly of collar portion 19f in the vehicle width direction and a nut 72 is fitted onto the shaft portion from outwardly of non-moving pulley 33. Thereby, collar portion 19f is inhibited from moving axially. Also, as shown in FIG. 4, collar portion 19f is coupled to the outer peripheral surface of shaft portion 19a by an axially extending spline 19h. Nut 72 is removed to enable removing collar portion 19f from shaft portion 19a.

Collar portion 19f includes a cylindrical-shaped lubricant holding portion 19j in the vicinity of a center in the axial direction. An inside diameter of lubricant holding portion 19j is larger than an inside diameter of the remaining portion of collar portion 19f. Thereby, a clearance is provided between lubricant holding portion 19j and the outer peripheral surface of shaft portion 19a. The clearance is filled with a lubricant. Lubricant holding portion 19j is formed with a plurality (here, two) of keyholes (shaft side hole) 19i through which keys 39 are inserted. Keyholes 19i are provided at equal intervals circumferentially of shaft portion 19a and extend through lubricant holding portion 19j. Ends 39a of keys 39 are press fitted into keyholes 19i whereby keys 39 are fixed to keyholes 19i.

As shown in FIG. 3, moving pulley 32 is arranged inwardly of non-moving pulley 33 in the vehicle width direction and cylindrical-shaped boss portion 32a extends axially of shaft portion 19a. As shown in FIG. 4 or 5, boss portion 32a is formed with guide holes (boss side holes) 32b that extend radially through boss portion 32a and through which keys 39 are inserted. Guide holes 32b are provided at equal intervals circumferentially of shaft portion 19a to respectively correspond to keyholes 19*i* of collar portion 19*f*. In this embodiment, guide holes 32*b* are provided on opposite sides to each other with the axis of shaft portion 19*a* therebetween. Guide holes 32*b* are axially extending slots and guide relative movements of keys 39 in the axial direction. As shown in FIG. 5, both ends 32*e* of guide hole 32*b* are larger in width than a central portion of guide hole 32*b*.

Figure 6:
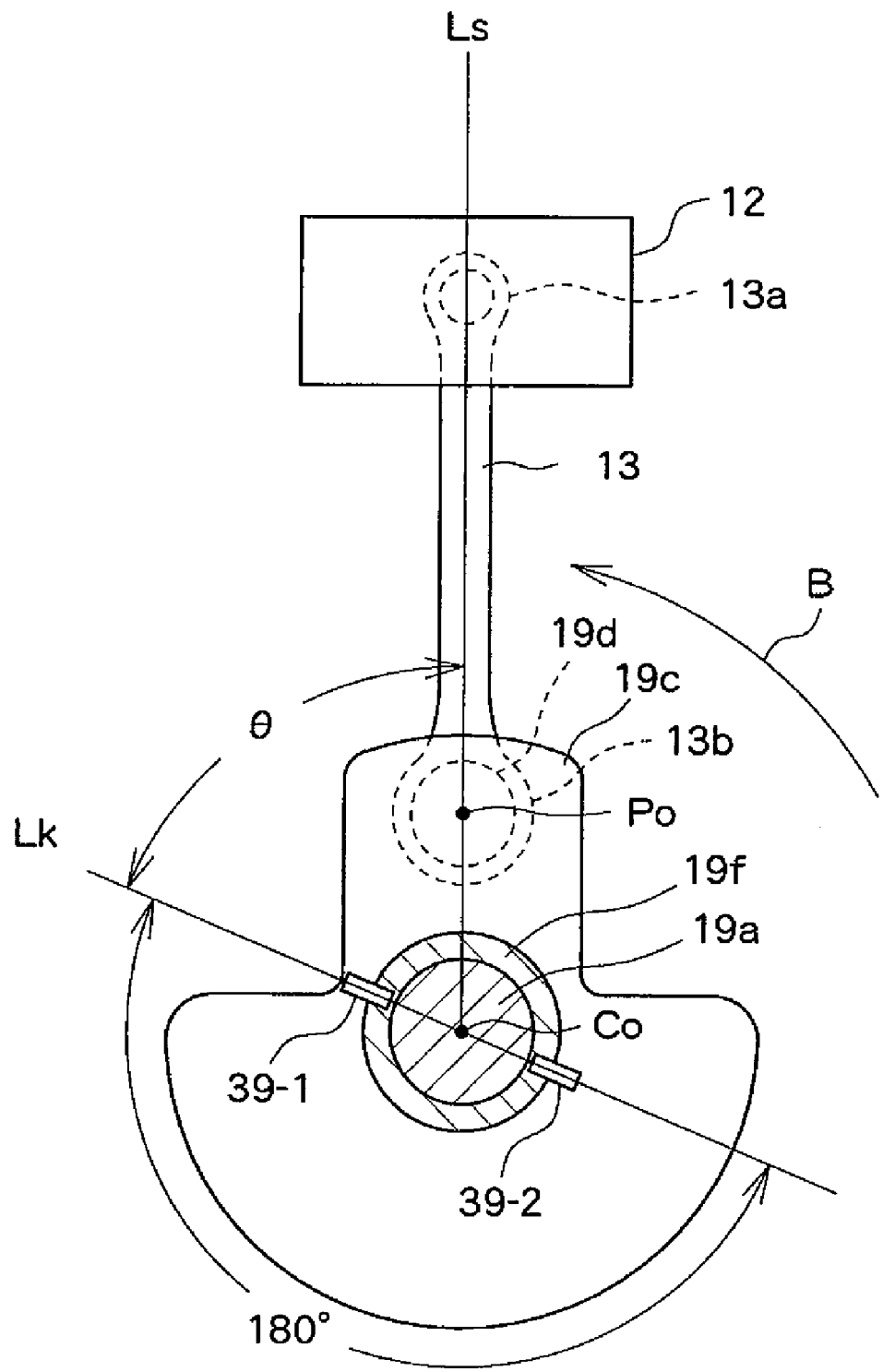
FIG. 6 is a diagram showing a positional relationship between keys and a crank pin according to the invention.

FIG. 6 illustrates the positional relationship between keys 39 and crank pin 19*d*. In FIG. 6, θ is an angle formed by a straight line Lk passing through keys 39 and an axis Co of shaft portion 19*a* and a straight line Ls in a rotating direction (direction B in FIG. 6) of crank shaft 19, on the basis of straight line Ls passing through axis Co of crank shaft 19 and a center Po of crank pin 19*d*. In FIG. 6, subscripts are added to respective keys 39 in order to discriminate between the two keys 39.

As shown in FIG. 6, key 39-1 is arranged in a position, in which the angle θ is at least 45° but at most 90° (about 80° in FIG. 6). Key 39-2 is arranged on an opposite side to key 39-1 with axis Co of shaft portion 19*a* therebetween.

As shown in FIG. 4, keys 39 have a height amounting substantially to the sum of a depth of guide hole 32*b* and a depth of keyhole 19*i*. Thereby, when ends 39*a* of keys 39 are press fitted into keyholes 19*i*, bases 39*b* (radially outward) of keys 39 engage with guide holes 32*b* in the rotating direction of shaft portion 19*a*. Guide holes 32*b* receive bases 39*b* of keys 39 inside thereof to guide relative movements of collar portion 19*f* in the axial direction.

Also, as shown in FIG. 4, keyholes 19*i* are slightly larger in axial (the vehicle width direction) length than keys 39. Thereby, even in a state, in which ends 39*a* of keys 39 are press fitted into keyholes 19*i*, clearances are provided on both left and right sides (inward and outward in the vehicle width direction) of keys 39. As a result, lubricant filled between an inner peripheral surface of lubricant holding portion 19*j* and the outer peripheral surface of shaft portion 19*a* passes through the clearances to flow outside lubricant holding portion 19*j* to lubricate guide holes 32*b* and bases 39*b* of keys 39.

Boss portion 32*a* of moving pulley 32 is fitted into cylindrical-shaped support member 58. Moving pulley 32 is inhibited from moving relative to support member 58 in the axial direction and moves axially together with support member 58 and sliding member 55. In the example, support member 58 is interposed between flange portion 32*d* of moving pulley 32 and a circlip 32*f* mounted to an inner end of boss portion 32*a* in the vehicle width direction, whereby support member 58 is inhibited from moving relative to moving pulley 32 in the axial direction. Also, support member 58 closes guide holes 32*b* from radially outward to prevent coming-off of keys 39.

As shown in FIG. 5, a lubricant holding portion 32*c* that is smaller in outside diameter than the remaining portion of boss portion 32*a* is provided in the vicinity of a center of boss portion 32*a* in the vehicle width direction (direction A). Guide holes 32*b* are formed across lubricant holding portion 32*c*. A lubricating oil flowing outside lubricant holding portion 19*j* described above passes through guide holes 32*b* to flow outside boss portion 32*a*. Outflowing lubricating oil enters between an outer peripheral surface of lubricant holding portion 32*c* and an inner peripheral surface of support member 58 and further enters between an outer peripheral surface of the remaining portion of boss portion 32*a* and the inner peripheral surface of support member 58 to provide for lubrication therebetween.

Sealing is provided between an outer peripheral surface of collar portion 19*f* and an inner peripheral surface of boss portion 32*a*, and between an outer peripheral surface of boss portion 32*a* and the inner peripheral surface of support member 58. Specifically, as shown in FIG. 4, an annular oil seal 73*a* is arranged between the outer end of boss portion 32*a* in the vehicle width direction and the outer peripheral surface of collar portion 19*f*. Also, an annular oil seal 73*b* is arranged between the inner end of boss portion 32*a* in the vehicle width direction and the outer peripheral surface of collar portion 19*f*. Further, an annular oil seal 73*c* is arranged between an outer end of support member 58 in the vehicle width direction and the outer peripheral surface of boss portion 32*a* and an oil seal 73*d* is arranged between an inner end of support member 58 in the vehicle width direction and the outer peripheral surface of boss portion 32*a*. Thereby, without being splashed on belt 37 or the like, lubricant flows between an inner peripheral surface of collar portion 19*f* and the outer peripheral surface of shaft portion 19*a*, between the outer peripheral surface of collar portion 19*f* and the inner peripheral surface of boss portion 32*a*, and between the outer peripheral surface of boss portion 32*a* and the inner peripheral surface of support member 58.

An example of a way to fit collar portion 19*f* into boss portion 32*a* of moving pulley 32 is now described. Boss portion 32*a* is fitted into collar portion 19*f* and either of them is turned to register positions of keyholes 19*i* with positions of guide holes 32*b*. A member (temporary detent member) for inhibiting relative rotation of collar portion 19*f* and boss portion 32*a* is temporarily inserted into one out of the two sets of positionally registered keyholes 19*i* and guide holes 32*b*. Key 39 is then inserted into the other set of keyholes 19*i* and guide holes 32*b* and ends 39*a* thereof are press fitted into keyhole 19*i*. The temporary detent member is then removed and replaced by key 39, and ends 39*a* thereof are press fitted into keyhole 19*i* in the same manner as described above.

With engine unit 10 described above, collar portion 19*f* is formed with a plurality (here, two) of keyholes 19*i* and boss portion 32*a* is formed with guide holes 32*b* positioned corresponding to keyholes 19*i*. Thereby, in assembling moving pulley 32 to crank shaft 19, key 39 can be press fitted into one set of keyholes 19*i* and guide holes 32*b* in a state in which a temporary detent member is inserted into the other set of keyholes 19*i* and guide holes 32*b*, so that the assembling work is improved in workability.

Also, since two keys 39 are inserted, a load applied on one key at the time of rotation of crank shaft 19 is decreased as compared with the case where only one key is inserted. As a result, the power unit is improved in durability.

Also, since keys 39 are provided on opposite sides to each other with the axis of shaft portion 19*a* therebetween, centrifugal forces generated by rotation of crank shaft 19 are balanced with each other.

Also, keyholes 19*i*, into which keys 39 are press fitted, extend through collar portion 19*f*. Thereby, as compared with a case where keyholes comprise bottomed recesses, forces tending to push out keys 39 once press fitted are decreased, so that it is possible to prevent coming-off of keys 39.

Also, keyholes 19*i* are formed on lubricant holding portion 19*j* of collar portion 19*f*. Thereby, it is possible to lubricate keys 39 and guide holes 32*b*.

Also, since collar portion 19*f* can be removed from shaft portion 19*a*, exchange of drive side pulley 31 can be achieved just by removing collar portion 19*f* from shaft portion 19*a* without breaking up crank case 22 when drive side pulley 31 is to be exchanged.

Figure 7:
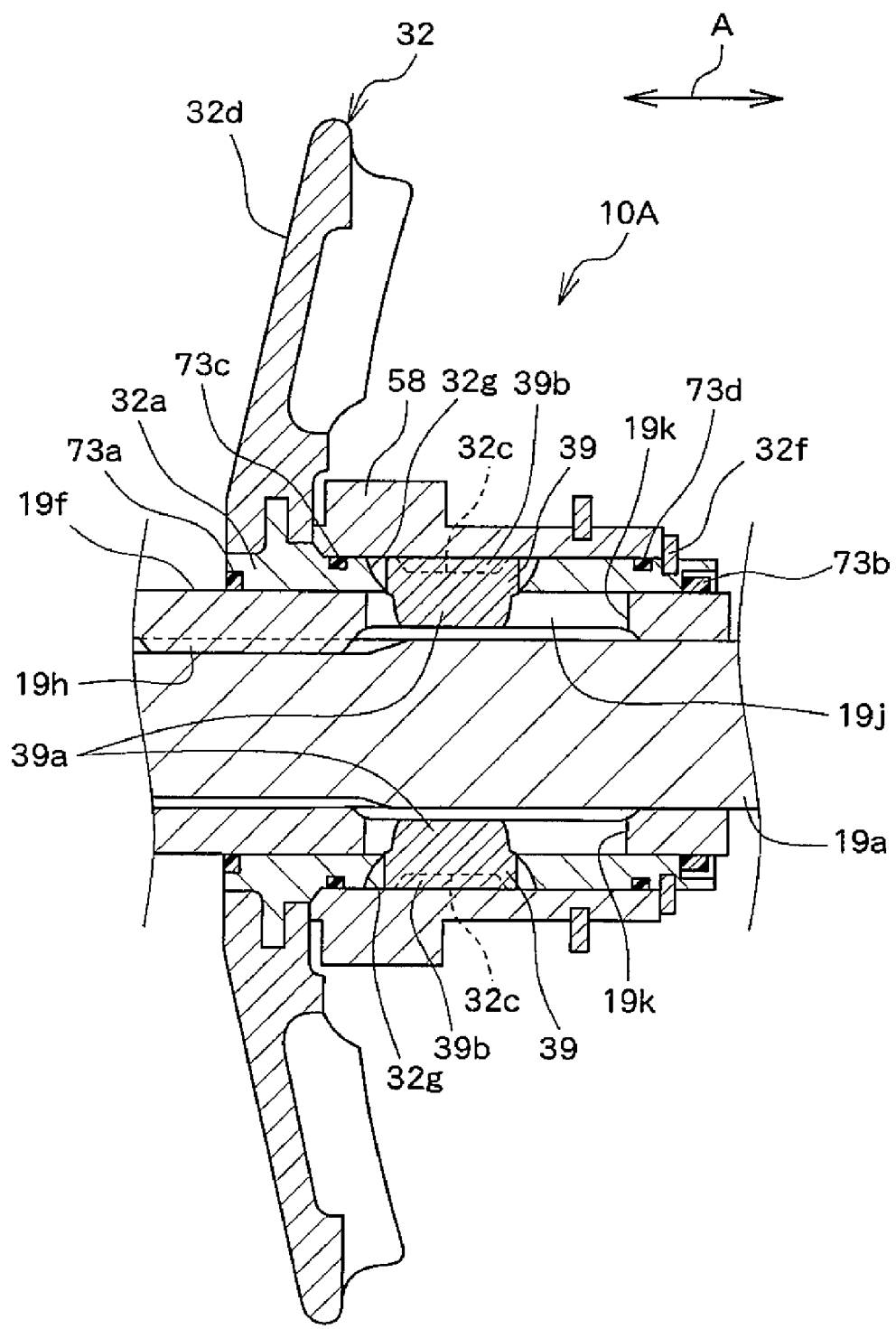
FIG. 7 is an enlarged cross sectional view of a moving pulley provided on an engine unit according to another embodiment of the invention.

The invention is not limited to engine unit 10 described above and encompasses various modifications. For example, while keys 39 are described as press fitted into collar portion 19*f*, they may be press fitted into a boss portion 32*a* of a moving pulley 32. FIG. 7 is an enlarged cross sectional view of a moving pulley 32 provided on an engine unit 10A according to a second embodiment. In FIG. 7, the same parts as those described above are denoted by the same reference numerals and repeat explanation is omitted.

As shown in FIG. 7, two keyholes 32g are formed on a boss portion 32a on engine unit 10A and positioned on opposite sides to each other with an axis of a shaft portion 19a therebetween. Axially extending guide holes 19k are formed on a collar portion 19f in correspondence to keyholes 32. Keys 39 are press fitted into and fixed to keyholes 32g. Guide holes 19k receive ends 39a of keys 39 to guide relative movements of moving pulley 32 and a crank shaft 19 in an axial direction.

Figure 8:
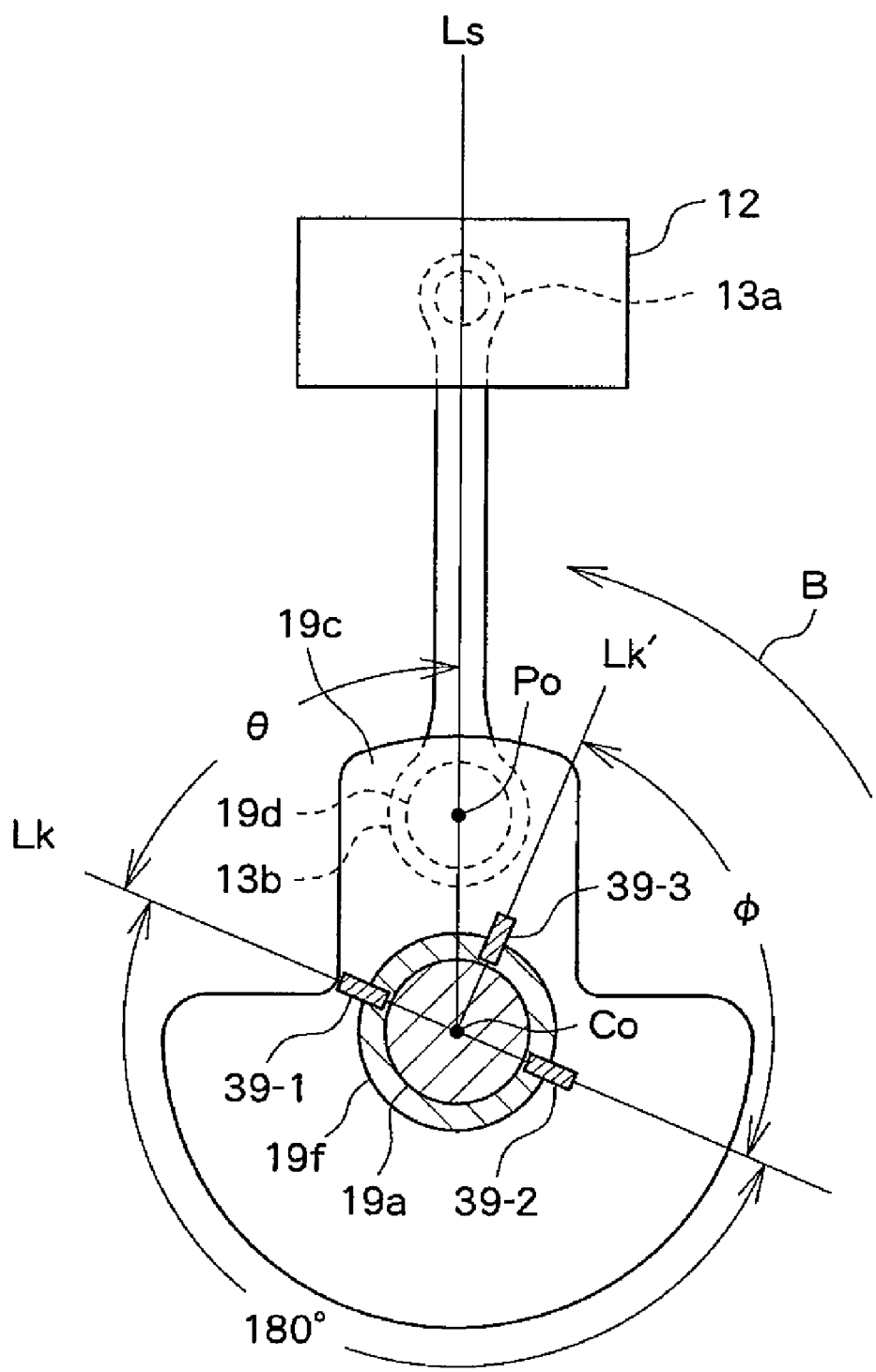
FIG. 8 is a view illustrating an example of a positional relationship between keys and a crank pin in a further embodiment of the invention.

Also, in the above description, two keyholes 19i and two guide holes 32b are formed. However, the invention is not so limited. For example, three keyholes 19i may be formed on collar portion 19f and guide holes 32b may be formed on boss portion 32a in positions that correspond to keyholes 19i. FIG. 8 illustrates an example of a positional relationship between keys 39 and a crank pin 19d in this embodiment. In FIG. 8, the same parts as those in FIG. 6 are denoted by the same reference numerals and repeat explanation is omitted, Subscripts are given to the three keys 39. As shown in FIG. 8, key 39-1 is arranged in a position, in which angle θ is at least 45° but at most 90° (about 80° in FIG. 8). Key 39-2 is arranged on an opposite side to key 39-1 with an axis Co of a shaft portion 19a therebetween. Key 39-3 is arranged toward a crank pin 19d relative to keys 39-1 and 39-2 and an angle φ formed between a straight line Lk' passing through key 39-3 and an axis Co of shaft portion 19a and a straight line Lk passing through key 39-1 and axis Co of shaft portion 19a is about 90°.

Also, in the above description, keys 39 are press fitted into keyholes 19i. However, instead of keyholes 19i, bolt holes may be formed on collar portion 19f and instead of keys 39, bolts may be fixed to the bolt holes.

Also, in the above description, engine 11, in which a mixture is burnt for driving, is mounted as a power source for a vehicle. However, the power source may instead be an electric motor driven by electric power, or a hybrid engine composed of a combination of an electric motor and an engine.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A power unit comprising:
   a power source;
   a rotating shaft that receives a driving force output from the power source, the rotating shaft including a crank pin; and
   a moving pulley including a cylindrical-shaped boss portion extending in an axial direction of and fitted onto the rotating shaft to be movable in the axial direction, wherein
   two shaft side holes are formed on an outer peripheral surface of the rotating shaft,
   two boss side holes are formed on and extend through the boss portion in positions that correspond to the shaft side holes,
   two detent members are inserted through the shaft side and boss side holes, wherein
      one end of each detent member is within either one of the shaft side holes or one of the boss side holes, and
      another end of each detent member is received by the shaft side hole or boss side hole that corresponds to the shaft side hole or boss side hole that the one end of the respective detent member is mounted to, the corresponding shaft side hole or boss side hole that receives the respective detent member comprising a slot extending in the axial direction to guide relative movements of the moving pulley and the rotating shaft in the axial direction,
   further wherein a first straight line extends through an axis of the rotating shaft and the detent members and a second straight line extends through the axis of the rotating shaft and a center of the crank pin, a first of the detent members being positioned so that an angle between the first straight line and the second straight line is at least 45° and at most 90°,
   the first detent member being arranged on a first side of the rotating shaft and the second of the detent members being arranged on a second side of the rotating shaft opposite the first side, the axis of the rotating shaft being between the first detent member and the second detent member.

2. The power unit according to claim 1, wherein the shaft side holes are provided at equal intervals in a circumferential direction on an outer peripheral surface of the rotating shaft, and
   the boss side holes are provided at equal intervals in the circumferential direction on the boss portion.

3. The power unit according to claim 2, wherein the boss portion is formed with the boss side holes and the rotating shaft is formed with the shaft side holes.

4. The power unit according to claim 1, wherein the boss side holes comprise the slots extending in the axial direction.

5. The power unit according to claim 4, wherein
   the rotating shaft includes a shaft portion that receives a driving force of the power source, and a cylindrical-shaped collar portion formed with the shaft side holes and fitted onto the shaft portion to rotate together with the shaft portion, and
   the shaft side holes extend through the collar portion and the detent members are press fitted into the plurality of shaft side holes.

6. The power unit according to claim 5, wherein
   the collar portion includes a cylindrical-shaped lubricant holding portion having a clearance between the cylindrical-shaped lubricant holding portion and an outer peripheral surface of the shaft portion and a lubricant in the clearance, and
   the shaft side holes extend through the lubricant holding portion.

7. The power unit according to claim 1, wherein
   the rotating shaft includes a shaft portion that receives a driving force of the power source, and a cylindrical-shaped collar portion formed with the shaft side holes and fitted onto the shaft portion to rotate together with the shaft portion, and
   the collar portion is fitted onto the shaft portion so as to enable removal from the shaft portion.

8. A straddle-type vehicle comprising the power unit according to claim 1.

9. The power unit according to claim 1, wherein the rotating shaft includes a shaft portion that receives a driving force of the power source, the axis of the rotating shaft being an axis of rotation of the shaft portion.

* * * * *